United States Patent [19]

Clemens et al.

[11] Patent Number: 4,728,571
[45] Date of Patent: Mar. 1, 1988

[54] POLYSILOXANE-GRAFTED COPOLYMER RELEASE COATING SHEETS AND ADHESIVE TAPES

[75] Inventors: Lawrence M. Clemens, Minneapolis, Minn.; Steven S. Kantner, Hudson, Wis.; Mieczyslaw Mazurek, Roseville, Minn.

[73] Assignee: Minnesota Mining and Manufacturing Company, St. Paul, Minn.

[21] Appl. No.: 757,278

[22] Filed: Jul. 19, 1985

[51] Int. Cl.$^4$ .......................... C09J 7/02; B05D 3/02; B32B 9/04
[52] U.S. Cl. .................................. 428/352; 428/354; 428/447; 428/450; 428/451; 428/454; 428/452; 428/906
[58] Field of Search ............... 428/352, 454, 354, 452, 428/906, 450, 451, 447; 427/208

[56] References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/122 |
| 2,876,894 | 3/1959 | Dahlquist et al. | 206/59 |
| 3,328,482 | 6/1967 | Northrup et al. | 260/825 |
| 3,342,625 | 9/1967 | Grossman et al. | 117/68.5 |
| 3,527,659 | 9/1970 | Kell | 117/145 |
| 3,770,687 | 11/1973 | Mestetsky | 260/30.4 SB |
| 3,997,702 | 12/1976 | Schurb et al. | 428/352 |
| 4,171,397 | 10/1979 | Morrow | 428/195 |
| 4,313,988 | 2/1982 | Koshar et al. | 428/40 |
| 4,609,574 | 9/1986 | Keryk et al. | 428/452 X |
| 4,614,677 | 9/1986 | Pennace et al. | 428/452 X |
| 4,617,238 | 10/1986 | Crivello et al. | 428/452 |

FOREIGN PATENT DOCUMENTS 57-179246 11/1982 Japan .
58-154766 9/1983 Japan .
58-167606 10/1983 Japan .
59-78236 5/1984 Japan .
59-126478 7/1984 Japan .

OTHER PUBLICATIONS

D. J. Cyterski, *Technical Seminar Proceedings* of the Pressure Sensitive Tape Council, (May 8–10, 1985), pp. 45–53.
Yamashita et al.–Polymer Bulletin 7, 289, (1982); 10, 368, (1983).
Yamashita et al.–Makromol. Chem. 185, 9, (1984).
Yamashita et al.–Macromolecules 18, 580, (1985).

*Primary Examiner*—P. C. Ives
*Attorney, Agent, or Firm*—Donald M. Sell; James A. Smith; Richard Francis

[57] ABSTRACT

Release coating compositions comprising polysiloxane-grafted copolymer and blends thereof with other polymeric materials on sheet materials and the back side of adhesive tapes are provided. Controlled and predictable release is achieved through variation of the number and the length, e.g., the molecular weight, of polysiloxane grafts in the copolymer.

27 Claims, No Drawings

POLYSILOXANE-GRAFTED COPOLYMER RELEASE COATING SHEETS AND ADHESIVE TAPES

TECHNICAL FIELD

This invention relates to sheet materials coated with low adhesion polymeric coatings and to pressure-sensitive adhesive coated tapes with low adhesion backsize coatings.

BACKGROUND ART

Polymeric coatings having specific release properties toward adhesives are widely used. Silicones such as polydimethylsiloxanes, polymers containing predominantly dimethylsiloxane units, are frequently employed as release coatings for products such as labels or large adhesive-coated sheets sold in other than roll form. Notwithstanding a relatively high cost, such polymers are used for these applications because of their capability of providing coatings of very low release value, e.g., in the range 0.4–1.6N/100 mm width. The term "release value" refers to the amount of force required to peel a strip of pressure-sensitive adhesive tape from a surface.

Polydimethylsiloxanes are less useful, however, as release coatings on the back surface of adhesive tape, because their low release force can cause roll instability and handling problems. Such a coating on the back surface of a tape is often referred to as a low adhesion backsize or LAB. LABs for tapes in roll form ideally exhibit release (or release value) toward the adhesive of about 6 to 35N/100 mm width. Polymers with higher release values make it increasingly difficult to use the tape, and delamination of the adhesive from the substrate often can result. Many non-silicone polymers, e.g., certain types of polyurethanes, find use as low adhesion backsizes for pressure sensitive tapes because of their much higher release value than that of the polydimethylsiloxanes, typically greater than 20N/100mm width. Such non-silicone LAB coatings are exemplified in U.S. Pat. Nos. 2,532,011, 2,607,711, 2,876,894 and 3,342,625.

For products such as tapes and liners, coatings having specific release properties toward adhesives which are intermediate between those of the polydimethylsiloxanes and conventionally used non-silicone LAB coatings are highly desired. Many previous attempts to provide such coatings by modification of polydimethylsiloxanes or by blending them with less effective release material, as disclosed in, for example, U.S. Pat. Nos. 3,328,482, 3,527,659 and 3,770,687, have not met with total success. Some of the resultant coating compositions so contaminate a pressure-sensitive sensitive adhesive that it loses its tack, while others gradually react with pressure-sensitive adhesives in such a manner that they cannot be separated after remaining in contact for an extended period of time. Other compositions are difficult to reproduce with consistency, exhibit changed release properties as the silicone gradually migrates to the surface, or require cure temperatures so high that curing adversely affects the substrate on which it is coated.

Some of these problems can be eliminated or reduced by the use of radiation curing (i.e., curing via ultraviolet light or electron beam) rather than thermal curing of silicone release coatings. Radiation curing of polydimethylsiloxane-containing coatings has been recently discussed by D. J. Cyterski in the *Technical Seminar Proceedings* of the Pressure Sensitive Tape Council (May 8–10, 1985), pages 45–53. Reference is made to the advantages of radiation curing in making possible the siliconization of heat-sensitive substrates and in producing coatings which often possess more stable release characteristics than those of thermally-cured coatings. According to this discussion, however, attempts at modification of these radiation-cured compositions to provide controlled release over a range of values have, to date, been only partially successful. In addition, the curing requirement itself is a disadvantage since it adds cost and additional steps to the coating process.

U.S. Pat. No. 4,171,397 discloses a composite release surface presenting areas of (1) fluorochemical polymer and (2) cured silicone polymer, and controllably providing release values in the range 0.8–35 N/100 mm width, requiring double coating and curing.

Coating compositions exhibiting intermediate release properties toward adhesives have been provided by reaction of an isocyanate with a hydroxyl- or amine-containing organosiloxane (U.S. Pat. No, 3,997,702) and by the use of epoxypolysiloxanes and their blends with epoxyterminated silanes (U.S. Pat. No. 4,313,988). The former method provides a coating which is effective with only a few specific adhesives, and, since these are crosslinked materials, both methods require a curing step.

Graft copolymers, some containing silicone, are being increasingly used for general modification of surface properties, as is described in a series of papers by Y. Yamashita et al., [Polymer Bulletin 7, 289 (1982); Polymer Bulletin 10, 368 (1983); Makromol. Chem. 185, 9 (1984); Macromolecules 18, 580 (1985)]. Such use is also reflected in some recent Japanese art, such as Japanese Patent Application No. 57-179246, published November 4, 1982, which concerns the use of graft copolymers as additives to impart hydrophobicity (or hydrophilicity) to surfaces. In Japanese Patent Application Nos. 58-167606, published Oct. 3, 1983, and 58-154766, published September 14, 1983, a method of preparation of silicone graft copolymers and the use of these copolymers in coating compositions such as paint films are described. Here, the copolymers provide water- and oil-repellency, stain resistance, and reduced frictional properties. Japanese Patent Application No. 59-78236, published May 7, 1984, discloses a method of preparing monofunctional polymeric silicone monomers, i.e., macromonomers, for use in the preparation of graft copolymers as surface treatment agents. The use of such silicone macromonomer-grafted copolymers in coating compositions, again to impart water- and oil-repellency, stain resistance and low friction characteristics, is described in Japanese Patent Application No. 59-126478, published July 21, 1984.

None of the aforementioned, however, teaches the use of chemically tailored, polysiloxane-grafted copolymers in controlled release applications involving pressure sensitive adhesives.

SUMMARY OF THE INVENTION

The present invention provides sheet materials with a release coating of a siloxane copolymer and tape constructions having a low adhesion backsize of the same copolymer. The copolymer which can be reliably produced, exhibits specific release properties toward tacky and pressure-sensitive adhesives throughout a broad range.

The invention provides a coated sheet material comprising a flexible sheet and a release coating covering at least a portion of one major surface thereof. The coating comprises a copolymer having a vinyl polymeric backbone with a $T_g$ or $T_m$ above about $-20°$ C., providing a tack-free material, and having grafted to the backbone monovalent siloxane polymeric moieties having a number average molecular weight above about 1,000 (preferably about 1,000 to about 50,000, most preferably about 5,000 to about 25,000). The number and composition of the grafted moieties in the copolymer is such as to provide the copolymer a surface release value not greater than about 50N/100 mm.

It should be understood that this upper limit of 50N/100 mm applies to use with highly aggressive pressure-sensitive adhesives (PSAs) which have peel adhesion values of 100N/100 mm or higher. PSAs as a group fall into three broad categories: (1) low (5-15N/100 mm), (2) intermediate (25-50N/100 mm), and (3) high (60-100 plus N/100 mm) peel adhesion ranges. Obviously, the degree of release can be selected to match the aggressiveness of the PSA with which it will be in contact and it is only for the most aggressive PSAs that a release value as high as 50N/100 mm would be selected. Release coatings for less aggressive PSAs would be selected to be correspondingly lower.

In the preferred embodiment the copolymer comprises repeating A and C monomers and optionally B monomer, wherein:

A is at least one free radically polymerizable vinyl monomer;

when used, B is at least one polar monomer copolymerizable with A, the amount by weight of B monomer being up to 30% of the total weight of all monomers; and C is a monomer having the general formula $X-(Y)_n-Si(R)_{3-m}Z_m$ wherein X is a vinyl group copolymerizable with the A and B monomers;

Y is a divalent linking group where n is zero or 1;

m is an integer of from 1 to 3;

R is hydrogen, lower alkyl (e.g., methyl, ethyl, or propyl), aryl (e.g., phenyl or substituted phenyl), or alkoxy;

Z is a monovalent siloxane polymeric moiety having a number average molecular weight above about 1,000 and is essentially unreactive under copolymerization conditions;

wherein the monomers are copolymerized to form the polymeric backbone with the C monomer grafted thereto and wherein the amount and composition of C monomer in the copolymer is such as to provide the release composition with a surface release value not greater than about 50N/100 mm.

The invention also provides a roll of tape which includes a flexible backing member, pressure-sensitive adhesive coating one major surface of the backing member, and a release coating on the opposite major surface of the backing comprising the copolymer defined above. The invention further provides a tape comprising a flexible backing member, pressure-sensitive adhesive coating one major surface of the backing member and a release liner comprising a flexible sheet coated over the major surface adhered to the pressure-sensitive coating with the copolymer defined above. The invention further provides a transfer tape comprising a film of pressure-sensitive adhesive between two release liners, at least one being coated with the copolymer.

The release coatings may comprise the defined copolymer alone, or may comprise such copolymers blended with compatible homopolymer, copolymer, etc. The low percentage of silicone graft makes them readily compatible with polymers of similar composition to the vinyl backbone which contain no silicone graft. In addition, there are several pairs of dissimilar polymers which yield compatible blends due to specific interaction as described by S. Krause in *Polymer Blends*, Academic Press, New York, 1978. Introduction of a low level of silicone graft onto one of these polymers will not influence their compatibility.

The copolymers have a well-defined structure, having a vinyl polymeric backbone which has been chemically modified via the grafting of a small weight percentage of monovalent siloxane polymeric moieties. When such copolymers are coated on a substrate, the siloxane grafts present a low energy, "siliconized" release surface, and the higher energy vinyl polymeric backbone provides adhesion to the base material. The "bulk" of the polymeric coating can be modified, e.g., to improve adhesion to the substrate or backing or, if a blend is desired, to enhance compatibility, without any serious perturbation of the surface characteristics of the film. The release properties of the coating are determined by both the siloxane content (weight percentage) of the copolymer and the molecular weight of the grafted siloxane polymeric moiety, with higher siloxane content and/or molecular weight providing easier release. A graft copolymer or copolymer blend can, therefore, be chemically tailored to provide a specific level of release which can be reproduced with consistency, and this makes possible the variation of the release properties of a backing over a range of values in a controlled fashion. Thus, by virtue of their chemical composition and structure and the resultant properties, the copolymers are uniquely well-suited to controlled release coating applications.

The preferred method of preparation of the release compositions of this invention provides graft copolymer of high purity which can be coated directly from the polymerization solvent. The resultant coatings do not require curing or crosslinking. However, if solvent resistance is desired for a particular application, crosslinking can be effected by standard methods well-known in the art, such as radiation curing (electron beam or ultraviolet light) or chemical crosslinking. Since siloxane constitutes only a minor weight fraction of the coating (even at high levels of release suitable for release liner applications), these copolymer compositions provide a potential cost savings over conventional 100% silicone release compositions and numerous blends.

The siloxane polymeric moieties can be grafted by polymerizing monomer onto reactive sites located on the backbone, by attaching preformed polymeric moieties to sites on the backbone, or, preferably, by copolymerizing the vinyl monomer with preformed polymeric monomer. Since the siloxane is chemically anchored to the backbone of the copolymer, this avoids migration problems common in much of the prior art which result in changed release properties or in adhesive contamination.

DETAILED DESCRIPTION OF THE INVENTION

A controlled release coating composition employed in the present invention comprises high molecular weight copolymer having a vinyl polymeric backbone with a $T_g$ or $T_m$ above about $-20°$ C. Monovalent siloxane polymeric moieties having a number average molecular weight above about 1,000 are grafted to the backbone. The copolymer preferably consists essentially of copolymerized repeating units from A and C monomers and, optionally, B monomers according to the description given above.

The A monomer or monomers (there may be more than one) are chosen such that a backbone $T_g$ or $T_m$ above about $-20°$ C. to provide a tack-free material is obtained upon polymerization of A (or A and B). Representative examples of A monomers include styrene, vinyl acetate, vinyl chloride, vinylidene chloride, acrylonitrile, and acrylic or methacrylic acid esters of non-tertiary alcohols such as methanol, ethanol, propanol, isopropanol, butanol, isobutanol, cyclohexanol, benzyl alcohol, dodecanol, hexadecanol, and octadecanol, the alcohols having from 1 to 18 carbon atoms. Such monomers are known in the art, and many are commercially available.

Preferred backbone compositions are poly(methyl methacrylate), poly(butyl methacrylate), poly(vinyl acetate), partially hydrolyzed poly(vinyl acetate), and poly(octadecyl acrylate).

Representative examples of polar B monomers are acrylic acid, methacrylic acid, itaconic acid, acrylamide, methacrylamide, N,N-dimethylacrylamide, methacrylonitrile, and maleic anhydride. Acrylic acid, methacrylic acid, and acrylamide are preferred. The amount by weight of B monomer preferably does not exceed 30% of the total weight of all monomers since higher percentages of B monomer may impart water sensitivity. Incorporation of B monomer to the extent of about 1 to about 10% by weight is most preferred in order to enhance adhesion of the copolymer to a backing.

The preferred C monomer may be further defined as having an X group which has the general formula

wherein $R^1$ is a hydrogen atom or a COOH group and $R^2$ is a hydrogen atom, a methyl group, or a CH$_2$COOH group.

The Z group of the C monomer has the general formula

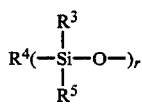

where $R^3$ and $R^5$ are independently lower alkyl, aryl, or fluoroalkyl, where lower alkyl and fluoroalkyl both refer to alkyl groups having from one to three carbon atoms and where aryl refers to phenyl or substituted phenyl. $R^4$ may be alkyl, alkoxy, alkylamino, aryl, hydroxyl, or fluoroalkyl, and r is an integer from about 5 to about 700. Preferably, the C monomer has a general formula selected from the group consisting of the following, where m is 1, 2, or 3, p is zero or 1, R'' may be alkyl or hydrogen, and X, R, and Z are as defined above:

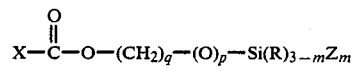

wherein q is an integer from 2 to 6;

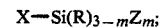

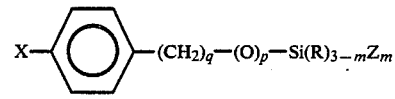

wherein q is an integer from zero to 2;

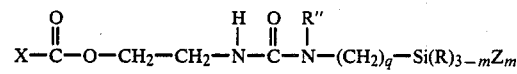

wherein q is an integer from 2 to 6;

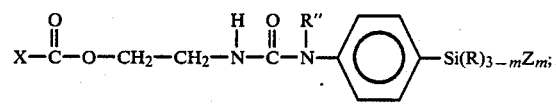

and

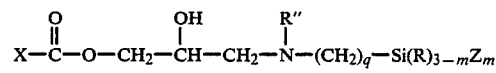

wherein q is an integer from 2 to 6.

When the above-described A, C, and, preferably, B monomers are copolymerized and coated on a backing, a release surface is obtained. The level of release is related to both the molecular weight of C and its weight percentage in the copolymer. Copolymers containing C monomer having a molecular weight less than about 1,000 are not very effective as release coatings. Copolymers containing C monomer having a molecular weight greater than 50,000 provide effective release coatings but little increase in performance is noted by increasing the molecular weight beyond 50,000. Also, at very high molecular weights of C, e.g., in excess of 50,000, possible incompatibility of the C monomer with the remaining monomer during the copolymerization process may result in reduced incorporation of C. A C monomer molecular weight range from about 1,000 to about 50,000 is therefore preferred. A molecular weight range from about 5,000 to about 25,000 is most preferred.

The C monomer is preferably incorporated in the copolymer in the amount of about 0.01 to about 20% of the total monomer weight to obtain the desired release value. The amount of C monomer included may vary depending upon the particular application and adhesive. Incorporation of such percentages of C monomer having a molecular weight in the above-specified range has been found to proceed smoothly and to result in material which provides effective release for a variety of adhesives while still being cost effective.

The total weight of B and C monomers is preferably within the range of about 0.01 to about 50% of the total weight of all monomers in the copolymer.

The C monomer of this invention is a terminally functional polymer having a single functional group (the vinyl group) and is sometimes termed a macromonomer or "macromer". Such monomers are known and may be prepared by the method disclosed by Milkovich et al., as described in U.S. Pat. Nos. 3,786,116 and 3,842,059. The preparation of polydimethylsiloxane macromonomer and subsequent copolymerization with vinyl monomer have been described in several papers by Y. Yamashita et al., [Polymer J. 14, 913 (1982); ACS Polymer Preprints 25 (1), 245 (1984); Makromol. Chem. 185, 9 (1984)]. This method of macromonomer preparation involves the anionic polymerization of hexamethylcyclotrisiloxane monomer ($D_3$) to form living polymer of controlled molecular weight, and termination is achieved via chlorosilane compounds containing a polymerizable vinyl group. Free radical copolymerization of the monofunctional siloxane macromonomer with vinyl monomer such as methyl methacrylate or styrene provides siloxanegrafted copolymer of well-defined structure, i.e., controlled length and number of grafted siloxane branches.

Suitable monomers for use in the above-mentioned anionic polymerization are, in general, diorganocyclosiloxanes of the formula

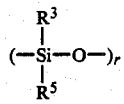

where $R^3$ and $R^5$ are as previously defined and where r is an integer of 3 to 7. Preferred are the cyclic siloxanes where r is 3 or 4 and $R^3$ and $R^5$ are both methyl, these cyclic siloxanes being hereafter designated $D_3$ and $D_4$, respectively. $D_3$, which is a strained ring structure, is especially preferred.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula

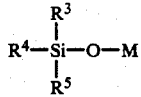

where M is alkali metal, tetraalkylammonium, or tetraalkylphosphonium cation and where $R^3$, $R^4$, and $R^5$ are as previously defined. The preferred triorganosilanolate initiator is lithium trimethylsilanolate (LTMS). In general, the preferred use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.2 mole of organometallic initiator per mole of monomer. Preferably, the amount will be from about 0.008 to about 0.04 mole of initiator per mole of monomer.

For the initiation of the anionic polymerization, an inert preferably polar organic solvent can be utilized. Anionic polymerization propagation with lithium counterion requires either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about $-20°$ C. to about $100°$ C. preferably from about $-10°$ C. to about $30°$ C. Anhydrous conditions and an inert atmosphere such as nitrogen, helium, or argon are required.

Termination of the anionic polymerization is, in general, achieved via direct reaction of the living polymeric anion with halogen-containing terminating agents, i.e., functionalized chlorosilanes, to produce vinylterminated polymeric monomers. Such terminating agents may be represented by the general formula $X-(Y)_n-Si(R)_{3-m}Cl_m$, where m is 1, 2, or 3 and where X, Y, n, and R have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromonomer. Purification of the macromonomer can be effected by precipitation in methanol.

The copolymerization of the A monomer, B monomer, if used, and C monomer is by conventional free radical polymerization such as described by Ulrich, U.S. Pat. No. Re. 24,906. The monomers are dissolved in an inert organic solvent and polymerized utilizing a suitable free radical initiator which can be either thermally or photochemically activated. Such initiators include azo compounds such as 2,2'-azobis(isobutyronitrile), hydroperoxides such as tert-butyl hydroperoxide, and peroxides such as benzoyl peroxide or cyclohexanone peroxide. The amount of initiator used is generally about 0.01 to about 5% by weight of the total polymerizable composition.

The organic solvent used in the free radical copolymerization can be any organic liquid which is inert to the reactants and product and which will not otherwise adversely affect the reaction. Suitable solvents include ethyl acetate and mixtures such as ethyl acetate with toluene, heptane with toluene and isopropyl alcohol, and heptane with toluene and methyl alcohol. Other solvent systems are useful. The amount of solvent is generally about 30–80% by weight of the total weight of reactants and solvent. In addition to solution polymerization, the copolymerization can be carried out by other well-known techniques such as suspension, emulsion, and bulk polymerization.

As described above, the preferred grafting technique involves copolymerization of vinyl monomer, A, polar monomer, B, when used, and chemically tailored macromonomer, C, of controlled molecular weight. Other grafting techniques can be employed, each providing a degree of predictability of the properties of the end product. One alternative technique involves preforming the vinyl polymeric backbone, then copolymerizing this preformed backbone with cyclic siloxane monomer. Another approach is to graft preformed monofunctional siloxane polymer to a preformed vinyl polymeric backbone. These and other polymer grafting techniques are described by Noshay and McGrath in *Block Copolymers*, Academic Press, New York (1977), pages 13–16 and in greater detail by Battaerd and Tregear in *Graft Copolymers*, J. Wiley and Sons, New York (1967).

The release copolymers defined above are best used as coatings upon a solid substrate, which may be a sheet, fiber, or shaped object. However, the preferred substrates are those used for pressure-sensitive adhesive products. Suitable substrates include paper, metal sheets and foils, nonwoven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions may be applied to suitable substrates by means of conventional coating techniques such as wire-wound rod, direct gravure, offset gravure, reverse roll, air-knife, and trailing blade coating; hot melt coating is also possible. The resultant coatings provide effective release for a wide variety of conventional pressure-sensitive adhesives such as natural rubber-based, acrylic, and other synthetic, film-forming elastomeric materials.

EXAMPLES

The following detailed description includes exemplary preparations of vinyl-terminated polymeric monomer (C) and numerous copolymer release compositions prepared with the various A, B, and C monomers. The A and B monomers are set forth hereinafter in Table I. The C monomers are identified as C-1 through C-6 and are described in specific detail in Table II. Examples 1–22 of release compositions made according to the present invention are set forth in Table IV. Other numbered examples follow. All parts in the examples are by weight unless otherwise specified.

Definition of Terms

The number average molecular weight ($\overline{M}_n$), weight average molecular weight ($\overline{M}_w$), and Z-average molecular weight ($\overline{M}_z$) are well-known mathematical descriptions of the molecular weight distribution of a polymer sample.

The polydispersity, abbreviated "$\rho$", is a measure of the molecular weight distribution of a polymer and is defined as $\overline{M}_w/\overline{M}_n$.

Each of the foregoing is a well-known term used by polymer chemists and others. Further explanation of the derivation of these terms may be found in J. F. Rabek's *Experimental Methods in Polymer Chemistry*, Wiley and Sons, 1981, Chapter 3 entitled "Molecular Weight Averages", pages 57–61.

Test Methods

The test method used to evaluate the release coated flexible sheet materials of the examples is a modification of the industry standard peel adhesion test used to evaluate PSA coated materials. The standard test is described in detail in various publications of the American Society for Testing and Materials (ASTM), Philadelphia, Pa. and the Pressure Sensitive Tape Council (PSTC), Glenview, Ill. The modified method is described in detail below and the reference source of the standard test method is also given.

Release Properties

Reference: Modification of ASTM D3330-78 PSTC-1 (11/75)

A quantitative measure of the release properties of the coating compositions reported herein is the force required to remove a flexible adhesive tape from an immobile substrate coated with the test composition at a specific angle and rate of removal. This is a modification of the standard peel adhesion measurement. In the examples this force is expressed in Newtons per 100 mm (N/100 mm) width of coated sheet. The procedure followed is:

(1) A 30 mm width of substrate coated with the release composition of interest was laminated with the coated surface up to the horizontal surface of a clean glass test plate using double coated tape.

(2) A 12.5 mm width of adhesive tape was applied to the coated surface with at least 12.7 lineal cm in firm contact. A hard rubber roller is used to apply the strip. The adhesive tape is chosen from (A) an acrylic PSA coated on cellulose acetate, (B) a tackified styrene/isoprene block copolymer PSA coated on paper backing, (C) a tackified styrene/isoprene block copolymer PSA coated on creped polypropylene backing, (D) a tackified natural rubber PSA containing glass fibers coated on polyester, (E) a tackified natural rubber PSA coated on creped saturated paper, (F) a tackified synthetic SBR rubber PSA coated on creped saturated paper, (G) an acrylic PSA coated on polyester, (H) a tackified natural rubber PSA coated on polyester, (I) an all methyl silicone PSA coated on fluorocarbon backing, (J) a low phenyl silicone PSA coated on polyester.

(3) The free end of the adhesive tape is doubled back nearly touching itself so the angle of removal will be 180°. The free end is attached to the adhesion tester scale.

(4) The scale reading in Newtons is recorded as the tape is peeled from the release surface. The data is reported as the average value of the range of numbers observed during the test.

(5) In some cases a readhesion test was done by taking the tape which had just been peeled from the release surface and adhering it to a clean glass plate, then doing a normal peel test. This was done to check for a drop in the adhesion value due to undesirable contamination of the adhesive surface by the release coating.

(6) In some cases an aging test was done by leaving the adhesive tape in contact with the coated surface for times up to several days and monitoring the change in release values under conditions of constant temperature and humidity.

Inherent Viscosity Measurements

The inherent viscosity of the copolymers was measured by conventional means using a Cannon-Fenske #50 viscometer in a water bath controlled at 25° C. to measure the flow time of 10 ml of a polymer solution (0.2 g of polymer per deciliter in ethyl acetate). The examples and control examples being run for comparison were run under identical conditions.

Gel Permeation Chromatography

The molecular weight distributions of the polymeric monomers and the controlled release coating compositions which utilize the polymeric monomers as pendant release moieties were determined by conventional gel permeation chromatography (GPC).

A Hewlett-Packard Model 1084B, high performance liquid chromatograph equipped with one Ultragel column of size $10^7$Å and four Ultrastyragel columns of size $10^5$Å, $10^4$Å, 500Å, and 100Å was used for all determinations. Samples were dissolved in toluene and filtered through a 0.5 micrometer polytetrafluoroethylene filter. Samples were injected at volumes of 170 microliters to 200 microliters and eluted at a rate of 1 ml per minute through the columns maintained at 40° C. Toluene was used as the solvent. The differential refractometer detector was a Hewlett-Packard Model 79877A. The system was calibrated using polystyrene standards and employing a linear least squares fit. All GPC calculations were performed on a Hewlett-Packard Model 3388 integrator and all molecular weight averages are polystyrene equivalent molecular weights. The molecular weight averages and polydispersities were calculated according to accepted practices. GPC test methods are further explained in *Modern Size Exclusion Liquid Chromatography* by W. W. Yau, J. J. Kirkland, and D. D. Bly, John Wiley and Sons, 1979.

"C" Monomer Preparation

Polymeric vinyl-terminated monomer, identified in the claims and herein as the "C" monomer, is prepared as described below.

The "C" monomers are identified in the foregoing descriptions and in the tables as "C" Monomers "C-1" –"C-6". The specific details of the chemical type of initiation ("Initiator") and termination ("Termination"), the number average molecular weight (rounded to the nearest thousand) ("Molecular Weight"), and the polydispersity ("Polydispersity") are given in Table II.

Monomer "C-1"

A methacrylate-terminated polydimethylsiloxane polymeric monomer having an average molecular weight of about 24,000 was prepared. A 100 ml, two-necked flask was fitted with a vacuum ampoule closed with a Rotaflo ® stopcock in one neck and with a Rotaflo ® stopcock connected to the other neck. The flask was flamed on the vacuum line and charged with 22.2 g (0.10 mole) of hexamethylcyclotrisiloxane ($D_3$) and approximately 60 ml of THF. The vacuum ampoule contained 0.089 g (0.93 mmole) of $Me_3SiOLi$ in 10 ml of heptane. The $D_3$ was first purified by fractional distillation followed by drying over calcium hydride in a vacuum ampoule at 66° C., wherefrom it was sublimed into the reaction flask. Lithium trimethylsilanolate was synthesized by the reaction of methyl lithium (low halide) with $D_3$ in the ratio of 3 to 1 (mole/mole) in heptane, as described by C. L. Frye et al., J. Org. Chem. 35, 1308 (1970). The lithium trimethylsilanolate was purified by sublimation in a vacuum system and distributed to weighed vials which were sealed off. A solution of the initiator in heptane was prepared by breaking the vial containing silanolate within a vacuum ampoule into which heptane was distilled. Lithium trimethylsilanolate solution was introduced to the reaction flask containing $D_3$ solution by opening the Rotaflo ® stopcock of the vacuum ampoule. The flask contents were maintained at 25° C. and stirred with a magnetic stirrer. The flask was pressurized with argon and the ampoule was replaced with a rubber septum to allow for taking samples of the reaction mixture. The decrease of the $D_3$ concentration was followed by gas chromatography analysis of the samples to monitor the progress of the polymerization. Polymerization was substantially complete after five hours. The capping agent, freshly distilled 3-methacryloxypropyldimethylchlorosilane (Petrarch System) (0.22 g, 1 mmole), was introduced through the septum and the reaction was continued for one hour with additional agitation of the mixture with an ultrasonic bath. The resultant polymer was added to a large excess of methanol, and the separated polymer layer was dissolved in ethyl ether and washed with water. The organic layer was dried with magnesium sulfate, filtered, and evaporated. The resultant polymer did not contain detectable quantities of low molecular weight materials, such as oligomeric siloxanes.

Gel permeation chromatography revealed a number average molecular weight ($\overline{M}_n$) of 23,899 and a weight average molecular weight ($\overline{M}_w$) of 28,347, resulting in a polydispersity ($p$) of 1.19.

Monomers "C-2a" to "C-2e"

Methacrylate-terminated polydimethylsiloxane polymeric monomers having average molecular weight of about 2,000, 5,000, 13,000, 16,000, and 18,000 were prepared following a procedure similar to that given above for the preparation of Monomer "C-1". For the preparation of these monomers, however, a solution of $D_3$ in a mixture of THF and heptane was prepared on the vacuum line, pressurized with dry argon, and kept in the flask fitted with a rubber septum. A solution of the initiator, lithium trimethylsilanolate, in heptane was prepared on the vacum line, as described above, for the series of syntheses. The ampoule was pressurized with dry argon.

In detail, 78.26 g of $D_3$ was dissolved in a mixture of 199.5 g of THF and 25.4 g of heptane to give a 38.5 weight % solution of $D_3$. A vial containing 1.2882 g of lithium trimethylsilanolate was broken open in the vacuum ampoule and the silanolate was dissolved in 6.99 g of heptane.

Five 100 ml two-necked flasks, each fitted with a condenser, a magnetic stirring bar, and a rubber septum, were oven dried, flushed with argon, and placed in the water bath maintained at 25° C.

A weighed amount of $D_3$ solution was introduced into each flask by means of a gas-tight syringe, followed by introduction of a weighed amount of the solution of lithium trimethylsilanolate. Progress of the polymerization was monitored by GC analysis of samples withdrawn from the reaction mixtures. When the degree of conversion of $D_3$ was higher than 95%, a 10 mole % excess of the capping agent, 3-methacryloxypropyldimethylchlorosilane, was introduced, and the reaction was maintained at 25° C. for one hour. The resultant polymer solutions were poured into an excess of methanol and purified following the procedure given for purification of Monomer "C-1".

Specific details as to the amount of $D_3$ ("$D_3$"), the amount of initiator ("$Me_3SiOLi$"), the amount of capping agent ("Capping Agent"), the number average molecular weight ("$\overline{M}_n$"), and the polydispersity ("$p$") of the Monomers "C-2a" to "C-2e" are given in Table III.

TABLE III

| Monomer | D3 (g) | Me3SiOLi (g) | Capping Agent (g) | $\overline{M}_n$ | $\rho$ |
| --- | --- | --- | --- | --- | --- |
| C-2a | 14.89 | 0.680 | 1.72 | 2,159 | 1.56 |
| C-2b | 14.66 | 0.250 | 0.63 | 6,223 | 1.23 |
| C-2c | 14.71 | 0.095 | 0.24 | 14,755 | 1.20 |
| C-2d | 14.86 | 0.079 | 0.20 | 18,085 | 1.17 |
| C-2e | 14.77 | 0.072 | 0.18 | 18,311 | 1.21 |

Monomer "C-3a"

A methacrylate-terminated polydimethylsiloxane polymeric monomer having an average molecular weight of about 20,000 was prepared. A flame-dried 1000 ml three-necked flask equipped with a mechanical stirrer, condenser, and septum and purged with dry argon was charged with a dilute solution of D3 (1 g) in heptane (100 ml), both freshly dried. 5.5 ml of BuLi (1.7M in hexane) (9.35 mmoles) was introduced and the initiation reaction was continued overnight at room temperature. 198.7 g (0.89 mole) of D3 in THF (496.8 g) was introduced into the reaction flask via Teflon® polytetrafluoroethylene (PTFE) tubing and the polymerization was continued for 8 hours with the reaction mixture maintained at room temperature. Progress of the reaction was monitored by GC analysis of the reaction mixture. Thereafter the capping agent, 3-methacryloxypropyldimethylchlorosilane (2.26 g, 10.3 mmoles), was introduced and the reaction mixture was stirred for 1 hour, while being additionally agitated in an ultrasonic bath which raised the temperature to about 40° C. The resultant polymer solution was poured into an excess of methanol with vigorous stirring. The separated polymer fraction was further purified following the procedure given for purification of Monomer "C-1".

Gel permeation chromatography revealed a number average molecular weight ($\overline{M}_n$) of 23,621 and a weight average molecular weight ($\overline{M}_w$) of 28,193, resulting in a polydispersity ($\rho$) of 1.19.

Monomer "C-3b"

A methacrylate-terminated polydimethylsiloxane polymeric monomer having an average molecular weight of about 10,000 was prepared. The procedure was the same as that used to prepare Monomer "C-3a" except that the amounts of lithium initiator, D3 monomer, and the capping agent were selected to produce a polymeric monomer of about half the "C-3a" molecular weight, i.e., 10,000. The monomer produced was analyzed by gel permeation chromatography which gave the following results: $\overline{M}_n = 12,881$, $\overline{M}_w = 14,756$, and polydispersity of 1.14.

Monomer "C-3c"

A methacrylate-terminated polydimethylsiloxane polymeric monomer having an average molecular weight of about 5,000 was prepared. The procedure was the same as that used to prepare Monomer "C-3a" except that the amounts of lithium initiator, D3 monomer, and the capping agent were selected to produce a polymeric monomer of about 5,000. The monomer produced was analyzed by gel permeation chromatography which gave the following results: $\overline{M}_n = 6,229$, $\overline{M}_w = 7,116$, and polydispersity of 1.14.

Monomer "C-4"

A styryl-terminated, two armed polydimethylsiloxane polymeric monomer having an average molecular weight of each arm of about 10,000, thus having an average molecular weight of the polymeric monomer of about 20,000, was prepared. An oven-dried 100 ml two-necked flask equipped with a magnetic stirring bar, condenser, and a septum and purged with dry argon was charged with a dilute solution of D3 (0.2 g) (about 1 mmole) in heptane (10 ml). 1.5 ml of s-BuLi (1.32M in cyclohexane) (2.0 mmoles) was introduced and the initiation reaction was continued overnight at room temperature. 20.9 g of D3 (94 mmoles) dissolved in THF (50 g) was introduced into the reaction flask via Teflon® PTFE tubing and the polymerization was continued for 8 hours with the reaction mixture maintained at room temperature. Progress of the reaction was monitored by GC analysis of the reaction mixture. Thereafter the capping agent, p-vinylphenylmethyldichlorosilane (0.43 g, 0.2 mole), was introduced and the reaction mixture stirred for 1 hour, while additionally agitated with an ultrasonic bath which raised the temperature to about 40° C. The resultant polymer solution was poured into an excess of methanol with vigorous stirring. The separated polymer fraction was further purified following the procedure given for purification of Monomer "C-1".

Gel permeation chromatography revealed a number average molecular weight ($\overline{M}_n$) of 13,381 and a weight average molecular weight ($\overline{M}_w$) of 18,195, resulting in a polydispersity ($\rho$) of 1.36.

Monomer "C-5"

A vinylbenzyl-terminated polydimethylsiloxane polymeric monomer having an average molecular weight of about 13,000 was made. The procedure was analogous to that used to prepare Monomer "C-4". D3 (0.2 g) (about 1 mmole) in heptane (10 ml) was introduced into the reaction flask to which 1.5 ml of s-BuLi (1.01M in cyclohexane) (1.52 mmoles) was added, and the initiation reaction was continued overnight at room temperature. 20.9 g of D3 (94 mmoles) dissolved in THF (50 g) was introduced into the reaction flask via Teflon® PTFE tubing and the polymerization was continued for 8 hours with the reaction mixture maintained at room temperature. Progress of the reaction was monitored by GC analysis of the reaction mixture. Thereafter the capping agent, (vinylbenzyl)dimethylchlorosilane (0.23 g, 1.1 mmoles), was added and the reaction mixture was stirred for 1 hour, while additionally agitated with an ultrasonic bath. The resultant polymer solution was poured into an excess of methanol and further purified following the procedure given for purification of Monomer "C-1".

Gel permeation chromatography revealed a number average molecular weight ($\overline{M}_n$) of 13,520 and a weight average molecular weight ($\overline{M}_w$) of 16,936, resulting in a polydispersity ($\rho$) of 1.25.

Monomer "C-6"

A methacrylate-terminated dimethylsiloxane oligomeric monomer with five silicon atoms, 1-(3-methacryloxypropyl)undecamethylpentasiloxane, was prepared by the reaction of Me3SiOLi with a stoichiometric amount of D3, followed by capping with 3-methacryloxypropyldimethylchlorosilane. In some instances, Me3SiOLi was generated in situ in the reaction of MeLi with $D_3$ in a nonpolar solvent, such as n-heptane, prior to introducing a polar solvent.

An oven-dried 100 ml, two-necked flask equipped with a magnetic stirring bar, condenser, and a septum and purged with dry argon was charged with 25 g of THF to which 10.16 g (0.11 mole) of $Me_3SiOLi$ was added, followed by a solution of 23.6 g of $D_3$ (0.11 mole) in 25 g of THF. The reaction was continued for 4 hours at room temperature with the progress of the reaction being monitored by GC analysis of samples withdrawn from the reaction mixture. Thereupon the capping agent, 3-methacryloxpropyldimethylchlorosilane (25.7 g, 0.12 mole), was introduced, and the reaction mixture was stirred for 4 hours at room temperature. The resulant oligomeric monomer was purified by vacuum distillation, b.p. 89° C./1 mm Hg. Its purity, as checked by GC, was over 95%.

TABLE I

| Abbreviation | Compound |
|---|---|
| | "A" Monomer |
| BMA | Butyl methacrylate |
| MMA | Methyl methacrylate |
| MA | Methyl acrylate |
| EA | Ethyl acrylate |
| ODA | Octadecyl acrylate |
| VOAc | Vinyl acetate |
| STY | Styrene |
| IOA | Isooctyl acrylate |
| | "B" Monomer |
| AA | Acrylic acid |
| NVP | N—vinyl-2-pyrrolidone |
| ACM | Acrylamide |

TABLE II

| "C" Monomer Designation | Initiator | Termination | Molecular Weight | Polydispersity |
|---|---|---|---|---|
| C-1 | $Me_3SiOLi$ | Methacrylate | 24,000 | 1.19 |
| C-2a | " | " | 2,000 | 1.56 |
| C-2b | " | " | 6,000 | 1.23 |
| C-2c | " | " | 15,000 | 1.20 |
| C-2d | " | " | 18,000 | 1.17 |
| C-2e | " | " | 18,000 | 1.21 |
| C-3a | n-BuLi | " | 24,000 | 1.19 |
| C-3b | " | " | 13,000 | 1.14 |
| C-3c | " | " | 6,000 | 1.14 |
| C-4 | s-BuLi | Styryl (2 arm) | 13,000 | 1.36 |
| C-5 | " | Vinylbenzyl | 14,000 | 1.25 |
| C-6 | $Me_3SiOLi$ | Methacrylate | 497 | Pentamer |

EXAMPLE 1

A control coating composition consisting of a copolymer of 95 parts butyl methacrylate and 5 parts acrylic acid was prepared.

In a glass reaction bottle was placed 19.0 g butyl methacrylate, 1.0 g acrylic acid, 30 g of ethyl acetate, and 0.06 g of 2,2'-azobis(isobutyronitrile) free radical initiator available under the trade designation "VAZO" 64 from the E. I. DuPont Company. The reaction bottle was purged with nitrogen and sealed. It was placed in a 55° C. bath and tumbled therein for 60 hours to produce a polymer which had an inherent viscosity of 0.58 dl/g. The resulting polymer solution was diluted with 50 g ethyl acetate and knife coated onto a 37 micrometer polyester film to provide a dry coating thickness of 10 micrometers. The coated film was equilibrated for 16 hours and thereafter tested under constant temperature and humidity. Test results for adhesion of an acrylic PSA (Tape A) and a tackified styrene isoprene block copolymer PSA (Tape B) are shown in Table IV.

EXAMPLES 2–4

Release compositions consisting of copolymers of butyl methacrylate, acrylic acid, and varying amounts of methacryloxypropyl-terminated polymeric monomer identified above as "Monomer C-6" were prepared. In a glass reaction bottle, the methacrylate-terminated polymeric monomer was combined with butyl methacrylate (A), acrylic acid (B), 30.0 g of ethyl acetate and 0.06 g initiator ("VAZO" 64). The bottle was purged with nitrogen, sealed, tumbled in a 55° C. water bath for 60 hours and the resulting release compositions coated on a 37 micrometer polyester film to a dry thickness of 10 micrometers and tested yielding the results shown below and in Table IV.

| Ex. No. | Monomers "A" | "B" | "C" | Release (N/100 mm) Tape A | Tape B |
|---|---|---|---|---|---|
| 1 | 95 | 5 | 0 | 29 | 132 |
| 2 | 94.8 | 5 | 0.2 | 25 | 120 |
| 3 | 94 | 5 | 1 | 28 | 98 |
| 4 | 88 | 5 | 7 | 25 | 45 |

These examples show that the use of a low molecular weight C monomer (MW=497) has only a slight effect on the release properties of a film up to a level of 7% by weight.

EXAMPLES 5–7

Monomer "C-2a" (MW 2000), which is more than four times the molecular weight of "C-6" in Examples 2–4, was copolymerized with butyl methacrylate (A) and acrylic acid (B) by the same procedure used in Examples 2–4.

TABLE IV

| | Monomers - Parts By Weight | | | | | Release (N/100 mm) | |
|---|---|---|---|---|---|---|---|
| Ex. No. | Butyl Methacrylate | Acrylic Acid | "C" | PBW | Inherent Viscosity | Tape A | Tape B |
| 1 | 95 | 5 | None | None | 0.58 | 29 | 132 |
| 2 | 94.8 | 5 | C-6 | 0.2 | 0.59 | 25 | 120 |
| 3 | 94 | 5 | C-6 | 1.0 | 0.58 | 28 | 98 |
| 4 | 88 | 5 | C-6 | 7.0 | 0.73 | 25 | 45 |
| 5 | 94.9 | 5 | C-2a | 0.1 | 0.57 | 27 | 106 |
| 6 | 94 | 5 | C-2a | 1.0 | 0.58 | 26 | 28 |
| 7 | 90 | 5 | C-2a | 5.0 | 0.67 | 15 | 4.3 |
| 8 | 94.9 | 5 | C-2b | 0.1 | 0.57 | 21 | 33 |
| 9 | 94 | 5 | C-2b | 1.0 | 0.56 | 3.2 | 4.5 |

TABLE IV-continued

| Ex. No. | Butyl Methacrylate | Acrylic Acid | "C" | PBW | Inherent Viscosity | Release (N/100 mm) Tape A | Tape B |
|---|---|---|---|---|---|---|---|
| 10 | 90 | 5 | C-2b | 5.0 | 0.59 | 1.0 | 1.2 |
| 11 | 94.9 | 5 | C-2c | 0.1 | 0.58 | 12 | 33 |
| 12 | 94 | 5 | C-2c | 1.0 | 0.56 | 2.8 | 11 |
| 13 | 90 | 5 | C-2c | 5.0 | 0.60 | 1.6 | 6.8 |
| 14 | 94.9 | 5 | C-2d | 0.1 | 0.55 | 10 | 27 |
| 15 | 94 | 5 | C-2d | 1.0 | 0.57 | 5.7 | 15 |
| 16 | 90 | 5 | C-2d | 5.0 | 0.60 | 1.2 | 6.6 |
| 17 | 94.9 | 5 | C-2e | 0.1 | 0.59 | 10 | 46 |
| 18 | 94 | 5 | C-2e | 1.0 | 0.58 | 2.9 | 14 |
| 19 | 90 | 5 | C-2e | 5.0 | 0.60 | 1.8 | 8.5 |
| 20 | 94.9 | 5 | C-1 | 0.1 | 0.59 | 14 | 53 |
| 21 | 94 | 5 | C-1 | 1.0 | 0.58 | 5.8 | 16 |
| 22 | 90 | 5 | C-1 | 5.0 | 0.61 | 5.8 | 12 |

| Ex. No. | Monomer "A" | "B" | "C" | Release (N/100 mm) Tape A | Tape B |
|---|---|---|---|---|---|
| 5 | 94.9 | 5 | 0.1 | 27 | 106 |
| 6 | 94 | 5 | 1 | 26 | 28 |
| 7 | 90 | 5 | 5 | 15 | 4.3 |

These examples show that for this molecular weight release properties are observed, and the level of this release is directly related to the amount of C monomer incorporated into the copolymer.

EXAMPLES 8–22

Various copolymer release compositions were prepared employing the methacryloxypropyl-terminated polymeric monomers C-2b, C-2c, C-2d, C-2e, and C-1 with butyl methacrylate (A) and acrylic acid (B) as comonomers according to the procedure described in Examples 2–4. Results shown in Table IV demonstrate that for a given weight percent of "C" monomer in the copolymer there is a continuing improvement in release properties as the molecular weight of the macromonomer is increased from 2000 (C-2a) to 6000 (C-2b) to 15000 (C-2c). Above 15000 a plateau is reached, and release values for a given weight percent of C monomer are similar, regardless of the monomer's molecular weight. These examples also demonstrate that for a given adhesive tape it is possible to vary the release values of a coating composition over an order of magnitude simply by varying the "C" monomer content between 0.1 and 5% by weight.

Polymer solutions from Examples 1, 10, 13, and 16 were diluted with ethyl acetate to 2% solids and coated using a wire-wound (Mayer) rod onto a variety of substrates yielding dry coating weights of approximately 1 g/m². The substrates included corona-treated non-oriented polypropylene (PP), primed polyester (PET), saturated creped paper, and machine-finished kraft paper. Results for release of Tape F from these thin coatings are shown in Table V.

TABLE V

| Ex. | Release (N/100 mm) PP | PET | Creped Paper | Kraft Paper |
|---|---|---|---|---|
| 1 | 37 | 44 | 40 | 45 |
| 10 | 3.1 | 9.6 | 7.7 | — |
| 13 | 1.1 | 0.2 | 3.7 | — |
| 16 | 1.3 | 0.2 | — | 12 |

They show that these coating compositions can be applied to a variety of substrates, yielding lower release values than the control coating (Example 1).

The release properties of the thin coatings of Examples 1, 10, 13, and 16 on primed polyester were examined for the variety of tapes described above under test methods. After removal from the coated release surface, the readhesion value of these tapes to a clean glass plate was examined. Results are given in Table VI. They show that these coatings function as release surfaces for a range of PSAs with various chemical compositions, including acrylics, tackified natural rubber, tackified synthetic rubbers, and silicones.

Contact with the release surfaces of Examples 10, 13, and 16 does not adversely affect the subsequent adhesion of the tapes relative to contact with the control surface (Example 1) which contains no silicone (C monomer).

TABLE VI

| Tape | Release (N/100 mm) Ex 1 | Ex 10 | Ex 13 | Ex 16 | Readhesion (N/100 mm) Ex 1 | Ex 10 | Ex 13 | Ex 16 |
|---|---|---|---|---|---|---|---|---|
| A | 33 | 3.8 | 0.9 | 0.9 | — | — | — | — |
| B | 132 | 5.4 | 2.4 | 2.7 | — | — | — | — |
| C | 21 | 2.2 | 0.5 | 0.4 | — | — | — | — |
| D | d | 17 | 7.9 | 8.3 | d | 62 | 67 | 61 |
| E | 34 | 20 | 2.2 | 2.2 | 56 | 54 | 55 | 55 |
| F | 44 | 9.6 | 0.2 | 0.2 | 47 | 42 | 48 | 50 |
| G | 25 | 14 | 0.9 | 0.9 | 27 | 22 | 28 | 22 |
| H | 33 | 3.3 | 0.9 | 1.1 | 48 | 49 | 51 | 49 |
| I | 43 | 43 | 16 | 18 | 39 | 42 | 45 | 45 |
| J | 29 | 16 | 5.3 | 6.1 | 25 | 25 | 25 | 26 | d = tape delaminates

EXAMPLE 22a

Four parts of the polymer from Example 1 (containing no C-monomer) were mixed with one part of the polymer from Example 13 (containing 5% by weight of monomer C-2c) to give a compatible blend with an effective concentration of 1% by weight of monomer C-2c. This was diluted with ethyl acetate to 2% solids and coated onto a 37 micrometer polyester film using a wire-wound rod to yield a dry coating weight of approximately 1 g/m².

Polymers from Examples 1, 13, and 12 (which contains 1% by weight of monomer C-2c) were diluted and coated in a similar manner.

The release properties of the resulting films were investigated with Tape E and the results are presented in Table VII.

TABLE VII

| Example | 1 | 12 | 13 | 22a |
|---|---|---|---|---|
| PBW C Monomer | 0 | 1 | 5 | 1 |
| Release (N/100 mm) | 44 | 27 | 2.0 | 28 |

This example shows that a compatible blend of a copolymer containing no C monomer with a copolymer containing a high percent of C monomer gives a release value similar to that of a copolymer containing the same weight percent of C monomer as in the blend.

EXAMPLE 23

This example shows that these copolymer coating compositions can also be prepared by emulsion polymerization.

A 250 ml 3-necked Morton flask equipped with a mechanical stirrer, argon inlet, and addition funnel was charged with 18.0 g butyl methacrylate, 1.0 g acrylic acid, 1.0 g monomer "C-2c", 1.0 g Siponate DS-10 and 82 mg carbon tetrabromide. Thirty grams of deionized water was added dropwise over 5 minutes to the flask while subjecting its contents to vigorous stirring and sonification from an external ultrasonic bath. This emulsification was continued for 40 minutes after the addition while purging the flask with argon. A mixture of 79 mg potassium persulfate and 32 mg sodium metabisulfite was added and the reaction mixture was stirred 16 hours at 25° C. under a positive pressure of argon. The resulting opalescent latex was filtered through a double layer of cheese cloth, which entrained a small amount of coagulum, and coagulated into methanol. After drying, the polymer was dissolved in ethyl acetate and knife coated onto a 37 micrometer polyester film to provide a dry coating thickness of 10 micrometers. Release values of Tape F for this coating and for a solution polymer of identical composition (Example 13) are shown in Table VIII.

TABLE VIII

| Example | IV (dl/g) | Release (N/100 mm) |
|---|---|---|
| 13 | 0.60 | 3.7 |
| 23 | 0.58 | 3.5 |

These results demonstrate that there is little difference in release values between a copolymer prepared by emulsion techniques and that prepared by solution techniques.

EXAMPLES 24–29

These examples show the effect of increasing the weight percent of C monomer up to 20%. Monomer "C-3b" was copolymerized with butyl methacrylate (A) and acrylic acid (B) by the same procedure used in Examples 2–4. The resulting polymer solutions were diluted with ethyl acetate to 2% and coated onto a 37 micrometer polyester film using a wire-wound rod to provide a dry coating weight of approximately 1 g/m². Compositions and release values for Tape E are given in Table IX.

TABLE IX

| Example | "A" | "B" | "C" | Release (N/100 mm) |
|---|---|---|---|---|
| 24 | 95 | 5 | 0 | 40 |
| 25 | 94 | 5 | 1 | 21 |
| 26 | 90 | 5 | 5 | 4.8 |
| 27 | 87.5 | 5 | 7.5 | 2.0 |
| 28 | 85 | 5 | 10 | 1.3 |
| 29 | 75 | 5 | 20 | 1.5 |

These results demonstrate that for this adhesive tape, no additional improvement in release properties is obtained on going above 7.5% monomer C.

EXAMPLES 30–36

These examples show the effect of variation in the nature and amount of polar B monomer. Monomer "C-3b" was copolymerized with butyl methacrylate (A) and various B monomers by the same procedure used in Examples 2–4. Control coating compositions were prepared with similar weight percents of A and B monomers, but leaving out the C monomer. The polymer solutions were coated as described for Examples 24–29. Compositions and release values for Tape E are given in Table X.

TABLE X

| Ex. | A (PBW) | B Type | B PBW | C (PBW) | Release (N/100 mm) |
|---|---|---|---|---|---|
| 30 | 95 | — | 0 | 5 | 6.1 |
| 31 | 70 | AA | 30 | 0 | 63 |
| 32 | 65 | AA | 30 | 5 | 7.2 |
| 33 | 97 | ACM | 3 | 0 | 45 |
| 34 | 92 | ACM | 3 | 5 | 7.0 |
| 35 | 90 | NVP | 10 | 0 | 51 |
| 36 | 85 | NVP | 10 | 5 | 13 |

These results reveal that the B monomer is optional (Example 30) or it may be increased to 30% by weight (Example 32) without a significant effect on release properties. In addition, the chemical nature of the B monomer may be changed (Examples 34 and 36).

EXAMPLES 37–47

These examples show the effect of variation in the nature of A monomer. Monomer "C-3b" was copolymerized with various A monomers and acrylic acid (B) by the same procedure used in Examples 2–4. Control coating compositions were prepared with similar weight percents of A and B monomers, but leaving out the C monomer. The polymer solutions were coated as described for Examples 24–29. Compositions and release values for Tape E are given in Table XI. These results demonstrate that a variety of A monomers can be used to prepare release coating compositions.

The glass transition temperatures of these "A" monomer backbones range from −25° C. to 100° C. It is noteworthy that an octadecyl acrylate, isooctyl acrylate, acrylic acid, and "C-3b" copolymer (Example 43), which is semi-crystalline ($T_m$=40° C.) rather than glassy, is also an effective release coating. This invention is not limited to homopolymers of a single A monomer, but copolymers of two or more A monomers are also effective release coatings as shown in Examples 43, 45, and 47.

TABLE XI
Variation in A Monomer

| Example | Type A(1) | PBW | Type A(2) | PBW | B(AA) | C-3b | $T_g$(°C.) | Release (N/100 mm) |
|---|---|---|---|---|---|---|---|---|
| 37 | EA | 100 | — | 0 | 0 | 0 | −25 | 53 |
| 38 | EA | 95 | — | 0 | 0 | 5 | −25 | 10 |
| 39 | VOAc | 95 | — | 0 | 0 | 5 | 30 | 1.3 |
| 40 | Sty | 90 | — | 0 | 5 | 5 | 100 | 2.6 |
| 41 | MA | 100 | — | 0 | 0 | 0 | 5 | 58 |
| 42 | MA | 95 | — | 0 | 0 | 5 | 5 | 19 |
| 43 | ODA | 80 | IOA | 13 | 5 | 2 | 40* | 9.2 |
| 44 | MMA | 45 | BMA | 50 | 5 | 0 | 60 | 57 |
| 45 | MMA | 43 | BMA | 47 | 5 | 5 | 60 | 2.4 |
| 46 | MMA | 70 | BMA | 25 | 5 | 0 | 85 | 60 |
| 47 | MMA | 68 | BMA | 22 | 5 | 5 | 85 | 3.7 |

*$T_m$

EXAMPLES 48–50

These examples show that the copolymerizable head group of the C monomer need not be methacryloxypropyl, and that m in the general formula for the C monomer can be greater than 1.

Butyl methacrylate (A) and acrylic acid (B) were copolymerized with either monomer C-4 (styryl head group, m=2) or C-5 (vinyl benzyl head group, m=1) by the same procedure as in Examples 2–4. A control coating composition was prepared with 95 parts A monomer and 5 parts B monomer. The polymer solutions were coated as described for Examples 24–29. Compositions and release values for Tape E are given in Table XII.

TABLE XII

| | A | B | C | | Release |
|---|---|---|---|---|---|
| Ex. | (PBW) | (PBW) | Type | PBW | (N/100 mm) |
| 48 | 95 | 5 | — | 0 | 57 |
| 49 | 90 | 5 | C-4 | 5 | 5.0 |
| 50 | 90 | 5 | C-5 | 5 | 3.3 |

EXAMPLES 51–57

These examples show the room temperature aging properties of the release coating compositions when an adhesive tape is left in contact with them for two hours, two days, or five days.

Various copolymer release compositions were prepared employing the methacryloxypropyl terminated polymeric monomers C-3a, C-3b, and C-3c with butyl methacrylate (A) and acrylic acid (B) as comonomers according to the procedure described in Examples 2–4. Compositions are given in Table XIII.

TABLE XIII

| | A | B | C | |
|---|---|---|---|---|
| Ex. | (PBW) | (PBW) | Type | (PBW) |
| 51 | 95 | 5 | — | 0 |
| 52 | 94 | 5 | C-3c | 1 |
| 53 | 90 | 5 | C-3c | 5 |
| 54 | 94 | 5 | C-3b | 1 |
| 55 | 90 | 5 | C-3b | 5 |
| 56 | 94 | 5 | C-3a | 1 |
| 57 | 90 | 5 | C-3a | 5 |

The resulting polymer solutions were coated as described for Examples 24–29 and the aging properties of these coatings, as well as those of Examples 31, 32, and 44–50, were investigated with Tape E. Results are presented in Table XIV.

These results show that good aging properties are obtained, particularly when the C monomer is 10000 MW or greater, and when it is present in a weight percentage reater than one percent.

TABLE XIV

| | | Release (N/100 mm) | | | |
|---|---|---|---|---|---|
| Ex. | PBW C | Initial | 2 hours | 2 days | 5 days |
| 31 | 0 | 63 | 57 | 61 | — |
| 32 | 5 | 7.2 | 6.3 | 11 | — |
| 44 | 0 | 41 | — | — | 57 |
| 45 | 5 | 1.5 | — | — | 2.4 |
| 46 | 0 | 47 | — | — | 60 |
| 47 | 5 | 1.5 | — | — | 3.7 |
| 48 | 0 | 57 | 58 | 62 | — |
| 49 | 5 | 5.0 | 19 | 20 | — |
| 50 | 5 | 3.3 | 8.8 | 12 | — |
| 51 | 0 | 39 | — | — | 63 |
| 52 | 1 | 18 | — | — | 50 |
| 53 | 5 | 8.8 | — | — | 31 |
| 54 | 1 | 21 | — | — | 43 |
| 55 | 5 | 4.8 | — | — | 11 |
| 56 | 1 | 26 | — | — | 44 |
| 57 | 5 | 2.2 | — | — | 2.2 |

EXAMPLES 58 and 59

These examples demonstrate the option of crosslinking the coating compositions, which is desirable in applications where solvent resistance is required, such as in their use as release liners.

To the copolymer solutions from Examples 29 and 39 was added 3 parts by weight of benzophenone. The resulting solutions were coated onto machine-finished kraft paper to provide a dry coating thickness of 8 micrometers. Half of each coated sheet was cured by exposure to high intensity ultraviolet radiation for 30 seconds. After equilibrating 16 hours under constant temperature and humidity, the sheets (both uncured and cured) were coated with a 40% solids solution of an acrylic pressure sensitive adhesive in ethyl acetate. The adhesive was a copolymer consisting of 96 parts isooctyl acrylate and 4 parts acrylic acid. These were dried at 65° C. for 10 minutes yielding an adhesive layer 25 micrometers thick. After equilibrating six hours, a sheet of 37 micrometer polyester film was laminated on top of the adhesive layer. A 12.5 mm width of this composite was adhered to a glass test plate with double coated tape and release values measured as described above. Results are shown in Table XV.

TABLE XV

| Example | Release (N/100 mm) |
|---|---|
| 29-uncured | 50 |
| 29-cured | 0.2 |
| 39-uncured | 27 |

TABLE XV-continued

| Example | Release (N/100 mm) |
| --- | --- |
| 39-cured | 7.4 |

In all cases clean separation of the adhesive from the kraft paper is observed, but the much higher values for the uncured coatings demonstrate the desirability of crosslinking for this application.

While this invention has been described in terms of specific embodiments, it should be understood that it is capable of further modification. The claims herein are intended to cover those variations which one skilled in the art would recognize as the chemical equivalent of what has been described here.

We claim:

1. A coated sheet material comprising a flexible sheet and a release coating covering at least a portion of one major surface thereof, said coating comprising a copolymer having a vinyl polymeric backbone with a $T_g$ or $T_m$ above about $-20°$ C. and having grafted to said backbone monovalent siloxane weight above about 1,000, the number and composition of said grafted moieties in said copolymer being such as to provide said copolymer a surface release value not greater than about 50N/100 mm.

2. The coated sheet material of claim 1 wherein said copolymer comprises copolymerized repeating A, B and C monomers, as follows, wherein:

A is least one free radically polymerizable vinyl monomer;

B is at least one polar monomer copolymerizable with A, the amount by weight of B monomer being up to 30% of the total weight of all monomers; and C is a monomer having the general formula $X-(Y)_n-Si(R)_{3-m}Z_m$ wherein X is a vinyl group copolymerizable with said A and B monomers;

Y is a divalent linking group where n is zero or 1;

m is an integer of from 1 to 3;

R is hydrogen, lower alkyl, aryl, or alboxy;

Z is a monovalent siloxane weight above about 1,000 and is essentially unreactive under copolymerization conditions;

wherein said monomers are copolymerized to form a polymeric backbone with said C monomer grafted thereto and wherein the amount and composition of C monomer in said copolymer is such as to provide said release composition with a surface release value not greater than about 50N/100 mm.

3. The coated sheet material of claim 2 wherein said A monomer is selected from the group consisting of styrene, vinyl acetate, vinyl chloride, vinylidene chloride, acrylonitrile, acrylic or methacrylic acid esters of non-tertiary alcohols having from 1 to 18 carbon atoms, and mixtures thereof.

4. The coated sheet material of claim 3 wherein said non-tertiary alcohol is selected from the group consisting of methanol, ethanol, propanol, isopropanol, butanol, isobutanol, cyclohexanol, benzyl alcohol, dodecanol, hexadecanol, and octadecanol.

5. The coated sheet material of claim 1 wherein said polymeric backbone is selected from the group consisting of poly(methyl methacrylate), poly(butyl methacrylate), poly(vinyl acetate), partially hydrolyzed poly(vinyl acetate), and poly(octadecyl acrylate).

6. The coated sheet material of claim 2 wherein said B monomer is selected from the group consisting of acrylic acid, methacrylic acid, itaconic acid, acrylamide, methacrylamide, N,N-dimethylacrylamide, methacrylonitrile, and maleic anhydride.

7. The coated sheet material of claim 2 wherein said B monomer comprises from about 1% to about 10% of the total weight of said copolymer.

8. The coated sheet material of claim 2 wherein the X group of said C monomer has the general formula

wherein $R^1$ is a hydrogen atom or a COOH group and $R^2$ is a hydrogen atom, a methyl group, or a $CH_2COOH$ group.

9. The coated sheet material of claim 2 wherein the Z group of said C monomer has the general formula

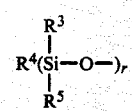

wherein $R^3$ and $R^5$ are independently lower alkyl, aryl, or fluoroalkyl, $R^4$ is alkyl, alkoxy, alkylamino, aryl, hydroxyl, or fluoroalkyl and r is an integer of about 5 to about 700.

10. The coated sheet material of claim 2 wherein said C monomer has a general formula selected from the group consisting of

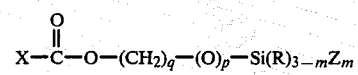

wherein p is zero or 1 and q is an integer from 2 to 6;

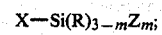

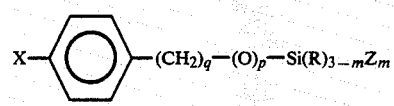

wherein p is zero or 1 and q is an integer from zero to 2;

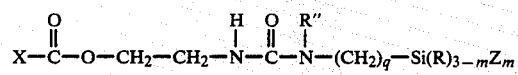

wherein q is an integer from 2 to 6 and wherein R" is hydrogen or alkyl;

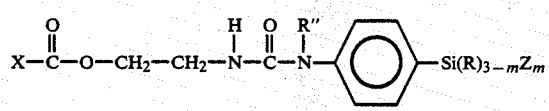

wherein R" is hydrogen or alkyl; and

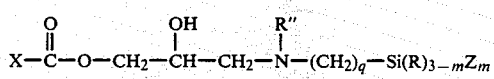

wherein q is an integer from 2 to 6 and wherein R" is hydrogen or alkyl.

11. The coated sheet material of claim 2 wherein said C monomer has a number average molecular weight of about 1,000 to about 50,000.

12. The coated sheet material of claim 2 wherein said C monomer has a number average molecular weight of about 5,000 to about 25,000.

13. The coated sheet material of claim 2 wherein said copolymer contains about 0.01% to about 20% by weight of said C monomer.

14. The coated sheet material of claim 2 wherein said copolymer contains about 0.01% to about 50% by weight of said B plus said C monomer.

15. The coated sheet material of claim 1 wherein said flexible sheet is formed of a material selected from the group consisting of paper, fabric, film-forming polymer, metal, rubber and ceramic.

16. The coated sheet material of claim 1 wherein said coating is coated over at least one entire major surface of said flexible sheet.

17. A roll of pressure-sensitive adhesive coated tape comprising:
(a) a flexible backing member;
(b) a pressure-sensitive adhesive coating one major surface of said backing member; and
(c) a release coating on the opposite major surface of said backing member, said release coating comprising a copolymer having a vinyl polymeric backbone with a $T_g$ or $T_m$ above about $-20°$ C. and having grafted to said backbone monovalent siloxane polymeric moieties having a number average molecular weight above about 1,000, the number and composition of said grafted moieties in said copolymer being such as to provide said copolymer a surface release value not greater than about 50 N/100 mm.

18. The roll of pressure-sensitive tape of claim 17 wherein said copolymer comprises copolymerized repeating A, B and C monomers, as follows, wherein:
A is at least one free radically polymerizable vinyl monomer;
B is at least one polar monomer copolymerizable with A, the amount by weight of B monomer being up to 30% of the total weight of all monomers; and
C is a monomer having the general formula $X-(Y)_n-Si(R)_{3-m}Z_m$ wherein
X is a vinyl group copolymerizable with said A and B monomers;
Y is a divalent linking group where n is zero or 1;
m is an integer of from 1 to 3;
R is hydrogen, lower alkyl, aryl, or alkoxy:
Z is a monovalent siloxane polymeric moiety having a number average molecular weight above about 1,000 and is essentially unreactive under copolymerization conditions;
wherein said monomers are copolymerized to form a polymeric backbone with said C monomer grafted thereto and wherein the amount and composition of C monomer in said copolymer is such as to provide said release composition with a surface release value not greater than about 50N/100 mm.

19. A tape comprising:
(a) a flexible backing member;
(b) a pressure-sensitive adhesive coating one major surface of said backing member; and
(c) adhered to the pressure-sensitive coating, a release liner comprising a flexible sheet coated over the major surface adhered to the pressure-sensitive coating with a release coating comprising a copolymer having a vinyl polymeric backbone with a $T_g$ or $T_m$ above about $-20°$ C. and having grafted to said backbone monovalent siloxane polymeric moieties having a number average molecular weight above about 1,000 the number and composition of said grafted moieties in said copolymer being such as to provide said copolymer a surface release value not greater than about 50N/100 mm.

20. The tape of claim 19 wherein said copolymer comprises copolymerized repeating A, B and C monomers, as follows, wherein:
A is at least one free radically polymerizable vinyl monomer;
B is at least one polar monomer copolymerizable with A, the amount by weight of B monomer being up to 30% of the total weight of all monomers; and
C is a monomer having the general formula $X-(Y)_n-Si(R)_{3-m}Z_m$ wherein
X is a vinyl group copolymerizable with said A and B monomers;
Y is a divalent linking group where n is zero or 1;
m is an integer of from 1 to 3;
R is hydrogen, lower alkyl, aryl, or alkoxy;
Z is a monovalent siloxane polymeric moiety havaing a number average molecular weight above about 1,000 and is essentially unreactive under copolymerization conditions;
wherein said monomers are copolymerized to form a polymeric backbone with said C monomer grafted thereto and wherein the amount and composition of C monomer in said copolymer is such as to provide said release composition with a surface release value not greater than about 50N/100 mm.

21. The coated sheet material of claim 1 wherein said copolymer is cross-linked.

22. The roll of tape of claim 17 wherein said copolymer is cross-linked.

23. The tape of claim 19 wherein said copolymer is cross-linked.

24. A transfer tape comprising a film of pressure-sensitive adhesive between release liners, at least one of said release liners being coated with a release coating comprising a copolymer having a vinyl polymeric backbone with a $T_g$ or $T_m$ above about $-20°$ C. and having grafted to said backbone monovalent siloxane polymeric moieties having a number average molecular weight above about 1,000, the number and composition of said grafted moieties in said copolymer being such as to provide said copolymer a surface release value not greater than about 50N/100 mm.

25. The transfer tape of claim 24 wherein said copolymer comprises repeating A, B and C monomers, as follows, wherein:
A is at least one free radically polymerizable vinyl monomer;
B is at least one polar monomer copolymerizable with A, the amount by weight of B monomer being up to 30% of the total weight of all monomers; and
C is a monomer having the general formula $X-(Y)_n-Si(R)_{3-m}Z_m$ wherein
X is a vinyl group copolymerizable with said A and B monomers;
Y is a divalent linking group where n is zero or 1;
m is an integer of from 1 to 3;
R is hydrogen, lower alkyl, aryl, or alkoxy;
Z is a monovalent siloxane polymeric moiety having a number average molecular weight above about 1,000 and is essentially unreactive under copolymerization conditions;

wherein said monomers are copolymerized to form a polymeric backbone with said C monomer grafted thereto and wherein the amount and composition of C monomer in said copolymer is such as to provide said release composition with a surface release value not greater than about 50N/100 mm.

26. The transfer tape of claim 24 wherein said copolymer is cross-linked.

27. The coated sheet material of claim 1 wherein said release coating comprises a compatible blend of said copolymer with another polymer.

* * * * *

UNITED STATES PATENT AND TRADEMARK OFFICE
CERTIFICATE OF CORRECTION

PATENT NO. : 4,728,571

DATED : March 1, 1988

INVENTOR(S) : Clemens et al

It is certified that error appears in the above-identified patent and that said Letters Patent is hereby corrected as shown below:

Column 13, line 43, delete the heading "Monomer $^{C-}3b$"" and insert in its place --Monomer "C-3b"--.

Column 14, line 34, "Monomer "C-5" should be centered and set apart from the text with a blank line before and after this heading.

Column 15, lines 14-15, delete "resulant" and insert in its place --resultant--.

Column 22, line 19, delete "reater" and insert in its place --greater--.

Claim 1, column 23, line 22, after the word "siloxane" insert the phrase --polymeric moieties having a number average molecular--.

Claim 2, column 23, line 41, delete "alboxy:" and insert in its place --alkoxy;--.

Claim 2, column 23, line 42, after the word "siloxane" insert the phrase --polymeric moiety having a number average molecular--.

UNITED STATES PATENT AND TRADEMARK OFFICE
CERTIFICATE OF CORRECTION

PATENT NO. : 4,728,571

DATED : March 1, 1988

INVENTOR(S) : Clemens et al

It is certified that error appears in the above-identified patent and that said Letters Patent is hereby corrected as shown below:

Claim 15, column 25, line 14, delete "lhe" and insert in its place --the--.

Claim 20, column 26, line 24, delete "havaing" and insert in its place --having--.

Signed and Sealed this

Fourth Day of April, 1989

Attest:

DONALD J. QUIGG

Attesting Officer

Commissioner of Patents and Trademarks